(12) United States Patent
Rossberg et al.

(10) Patent No.: US 9,931,717 B2
(45) Date of Patent: Apr. 3, 2018

(54) ASSEMBLY HAVING AT LEAST TWO CERAMIC BODIES JOINED WITH ONE ANOTHER, ESPECIALLY A PRESSURE MEASURING CELL, AND METHOD FOR JOINING CERAMIC BODIES BY MEANS OF AN ACTIVE HARD SOLDER, OR BRAZE

(71) Applicants: ENDRESS+HAUSER GMBH+CO. KG, Maulburg (DE); FRIEDRICH-SCHILLER-UNIVERSITÄT, Jena (DE)

(72) Inventors: Andreas Rossberg, Bad Sackingen (DE); Elke Schmidt, Bad Sackingen (DE); Markus Rettenmayr, Jena (DE); Peter Siegmund, Jena (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 144 days.

(21) Appl. No.: 14/440,736

(22) PCT Filed: Oct. 28, 2013

(86) PCT No.: PCT/EP2013/072475
§ 371 (c)(1),
(2) Date: May 5, 2015

(87) PCT Pub. No.: WO2014/072193
PCT Pub. Date: May 15, 2014

(65) Prior Publication Data
US 2015/0298264 A1 Oct. 22, 2015

(30) Foreign Application Priority Data
Nov. 6, 2012 (DE) .................. 10 2012 110 618

(51) Int. Cl.
*B23K 35/32* (2006.01)
*C04B 37/00* (2006.01)
(Continued)

(52) U.S. Cl.
CPC ............ *B23K 35/32* (2013.01); *B23K 1/0008* (2013.01); *B23K 1/19* (2013.01); *B23K 1/20* (2013.01);
(Continued)

(58) Field of Classification Search
CPC ...................................... B23K 35/32
See application file for complete search history.

(56) References Cited

U.S. PATENT DOCUMENTS 5,334,344 A * 8/1994 Hegner ............... B22D 11/0611
228/121
9,136,662 B2 9/2015 Rossberg
(Continued)

FOREIGN PATENT DOCUMENTS

| | | |
|---|---|---|
| CN | 102656433 A | 9/2012 |
| DE | 102009054909 A1 | 6/2011 |

(Continued)

OTHER PUBLICATIONS

German Search Report, German Patent Office, Munich, DE, dated Aug. 6, 2013.
(Continued)

*Primary Examiner* — Clayton E Laballe
*Assistant Examiner* — Dennis Hancock
(74) *Attorney, Agent, or Firm* — Bacon & Thomas, PLLC

(57) ABSTRACT

An assembly comprising: two ceramic bodies, which are joined by means of a joint of an active hard solder, or braze, wherein the active hard solder, or braze, has a continuous core volume, which is spaced, in each case, from the ceramic bodies by at least 1 μm, and an average composition $C_K$ with
(Continued)

a liquidus temperature $T_l(C_K)$, wherein the composition $C_K$ has a coefficient of thermal expansion $\alpha(C_K)$, wherein $\alpha(C_K)=m\cdot\alpha(K)$, wherein $m\leq 1.5$, especially $m\leq 1.3$ and preferably $m\leq 1.2$, wherein $\alpha(K)$ is the average coefficient of thermal expansion of the ceramic material of the ceramic bodies, wherein the joint has boundary layers, which border on the ceramic body, wherein at least one of the boundary layers, which lies outside of the core volume, has an average composition $C_B$ with a liquidus temperature $T_l(C_B)$, which lies not less than 50 K, preferably not less than 100 K, and especially preferably not less than 200 K, under the liquidus temperature $T_l(C_K)$ of the average composition $C_K$ of the core volume.

19 Claims, 2 Drawing Sheets

(51) Int. Cl.

| | | |
|---|---|---|
| | *C22C 16/00* | (2006.01) |
| | *B23K 35/40* | (2006.01) |
| | *B23K 1/00* | (2006.01) |
| | *B23K 1/19* | (2006.01) |
| | *B23K 1/20* | (2006.01) |
| | *B32B 18/00* | (2006.01) |
| | *G01L 9/00* | (2006.01) |

(52) U.S. Cl.
CPC ............ *B23K 35/325* (2013.01); *B23K 35/40* (2013.01); *B32B 18/00* (2013.01); *C04B 37/006* (2013.01); *C22C 16/00* (2013.01); *G01L 9/0041* (2013.01); *B23K 2035/408* (2013.01); *C04B 2235/9607* (2013.01); *C04B 2237/122* (2013.01); *C04B 2237/126* (2013.01); *C04B 2237/127* (2013.01); *C04B 2237/343* (2013.01); *C04B 2237/592* (2013.01); *C04B 2237/708* (2013.01); *C04B 2237/72* (2013.01)

(56) References Cited

U.S. PATENT DOCUMENTS

| | | | |
|---|---|---|---|
| 2005/0161494 A1* | 7/2005 | Matsu | B23K 1/0012 228/183 |
| 2012/0258322 A1* | 10/2012 | Berlinger | C04B 37/006 428/450 |
| 2015/0135844 A1* | 5/2015 | Ponath | B23K 1/0008 73/724 |

FOREIGN PATENT DOCUMENTS

| | | |
|---|---|---|
| DE | 102010043119 A1 | 5/2012 |
| DE | 102011005665 A1 | 9/2012 |

OTHER PUBLICATIONS

International Search Report, EPO, The Netherlands, dated Dec. 3, 2013.
English Translation of the International Preliminary Report on Patentability, WIPO, Geneva, CH, dated May 21, 2015.

* cited by examiner

ASSEMBLY HAVING AT LEAST TWO CERAMIC BODIES JOINED WITH ONE ANOTHER, ESPECIALLY A PRESSURE MEASURING CELL, AND METHOD FOR JOINING CERAMIC BODIES BY MEANS OF AN ACTIVE HARD SOLDER, OR BRAZE

TECHNICAL FIELD

The present invention relates to an assembly, which has at least two ceramic bodies joined with one another, especially a pressure measuring cell, as well as to a method for joining ceramic bodies by means of an active hard solder, or braze.

BACKGROUND DISCUSSION

Due to the special relevance of the invention for pressure measurement cells, the invention will be explained based on pressure measurement cells as an example of its application.

Pressure measurement cells according to the state of the art combine a ceramic measuring membrane and a ceramic platform, wherein the measuring membrane is connected pressure-tightly with the platform along a peripheral joint, which contains an active hard solder, or braze, wherein a pressure chamber is formed between the measuring membrane and the platform, wherein the equilibrium position of the measuring membrane results from the difference between a pressure reigning in the pressure chamber and a pressure acting on the outside surface of the measuring membrane, thus its surface facing away from the pressure chamber.

Serving as material for the platform and the measuring membrane are especially aluminum oxide ceramics, which, due to their elastic properties and their media resistance, are suited for the manufacture of pressure measurement cells. The mentioned ceramic components are especially joined with an active hard solder, or braze, which is preferably an active hard solder, or braze, containing Zr, Ni and Ti. The manufacture of such an active hard solder, or braze, is disclosed, for example, in European Offenlegungsschrift (laid open application) EP 0 490 807 A2. According to the method described there, especially rings of the active braze, material can be manufactured, which are positioned between measuring membrane and platform, in order to solder, or braze, these with one another.

For joining the components, for example, the ceramic bodies are heated with an intermediately lying, solder preform in high vacuum to a temperature, which melts the active hard solder, or braze, so that a reaction begins between the active hard solder, or braze, and the ceramic bodies. By cooling, the active hard solder, or braze, solidifies and the reaction between the active hard solder, or braze, and the ceramic body is stopped. During cooling, however, different coefficients of thermal expansion of the material of the ceramic body, on the one hand, and of the active hard solder, or braze, on the other hand, can lead to considerable stresses between the ceramic components and the joint, since after solidification of the solder there is still a cooling of several hundred K.

In selecting an active hard solder, or braze, with a coefficient of thermal expansion suitable for the ceramic material, however, attention must be paid that the suitable active hard solder, or braze, does not have too high a melting point and, thus, not be suitable for joining the ceramic components, for example, because electrodes, which are provided on the ceramic bodies cannot withstand such temperatures.

SUMMARY OF THE INVENTION

It is, consequently, an object of the invention to provide an assembly and a pressure measuring cell, as well as a manufacturing process therefor, whereby the mentioned disadvantages of the state of the art are overcome.

The object is achieved according to the invention by an assembly, a pressure measuring cell and a method.

The assembly of the invention includes a first ceramic body and a second ceramic body, wherein the first ceramic body and the second ceramic body are connected by means of a joint, wherein the joint contains an active hard solder, or braze, wherein the active hard solder, or braze, averaged over a continuous core volume, which is spaced from the first ceramic body and from the second ceramic body, in each case, by at least 1 μm, especially at least 2 μm, has an average composition $C_K$ having a liquidus temperature $T_l(C_K)$, wherein the composition $C_K$ has a coefficient of thermal expansion $\alpha(C_K)$, wherein $\alpha(C_K)=m \cdot \alpha(K)$, wherein $m \leq 1.5$, especially $m \leq 1.3$ and preferably $m \leq 1.2$, wherein $\alpha(K)$ is the average coefficient of thermal expansion of the ceramic material, respectively the ceramic materials of the first and second ceramic bodies, wherein the joint has a first boundary layer and a second boundary layer, which border on the first ceramic body, respectively on the second ceramic body, wherein according to the invention at least one of the boundary layers, which lies outside of the core volume, has an average composition $C_B$ having a liquidus temperature $T_l(C_B)$, which lies not less than 50 K, especially not less than 100 K, and preferably not less than 200 K under the liquidus temperature $T_l(C_K)$ of the average composition $C_K$ of the core volume.

wherein the composition $C_K$ has a coefficient of thermal expansion $\alpha(C_K)$, wherein $\alpha(C_K)=m \cdot \alpha(K)$, wherein $m \leq 1.5$, especially $m \leq 1.3$ and preferably $m \leq 1.2$, wherein $\alpha(K)$ is the average coefficient of thermal expansion of the ceramic material, respectively the ceramic materials of the first and second ceramic bodies, wherein the joint has a first bounding layer and a second bounding layer, which border on the first ceramic body, respectively on the second ceramic body, wherein according to the invention at least one of the bounding layers, which lies outside of the core volume, has an average composition $C_B$ having a liquidus temperature $T_l(C_B)$, which lies not less than 50 K, especially not less than 100 K, and preferably not less than 200 K under the liquidus temperature $T_l(C_K)$ of the average composition $C_K$ of the core volume.

In a further development of the invention, the at least one boundary layer has a thickness of no more than 3 μm, especially no more than 2 μm and preferably no more than 1 μm.

In a further development of the invention, at least 40%, preferably at least 60% and especially preferably at least 70%, of the volume of the joint has the composition $C_K$.

In a further development of the invention, the composition $C_B$ has a liquidus temperature $T_l(C_B)$, which lies no more than 300 K, especially no more than 150 K, and preferably no more than 50 K above the liquidus temperature $T_l(C_e)$ of the eutectic point, respectively the nearest intersection with a eutectic valley, having a composition $C_e$ in the composition space, wherein $C_e:=(c_{e1}, \ldots, c_{eN})$, wherein $|C_e|=1$, and wherein the $c_{ei}$ are the stoichiometric fractions of the components $K_i$ with $i=1, \ldots, N$ at the eutectic point, respectively a nearest intersection with a eutectic valley, wherein $C_B:=(c_{B1}, \ldots, c_{BN})$, wherein $|C_B|=1$, and wherein the $c_{Bi}$ are the stoichiometric fractions of the components $K_i=1, \ldots, N$ of the average composition of the active hard solder, or braze in the boundary layer.

In a further development of the invention:
$C_e:=(c_{e1}, \ldots, C_{eN})$, wherein $|C_e|=1$, wherein the $c_{ei}$ are the stoichiometric fractions of the components $K_i$ with $i=1, \ldots, N$ at the eutectic point, respectively at the nearest intersection with a eutectic valley;
$C_K:=(c_{K1}, \ldots, c_{KN})$, wherein $|C_K|=1$, and wherein the $c_{Ki}$ are the stoichiometric fractions of the components $K_i$, with $i=1, \ldots, N$, of the average composition of the active hard solder, or braze, in the core volume; and
$C_B:=(c_{B1}, \ldots, c_{BN})$, wherein $|C_B|=1$, and wherein the $c_{Bi}$ are the stoichiometric fractions of the components $K_i$ $i=1, \ldots, N$ of the average composition of the active hard solder, or braze, in the bounding layer,
wherein the difference between the composition $C_e$ and the composition $C_B$ is describable with a normalized vector difference $D_{eB}$,
wherein $C_e=C_B+a_{eB}*D_{eB}$, with $|D_{eB}|=1$,
wherein the difference between the composition $C_K$ and the composition $C_B$ is describable with a normalized vector difference $D_{KB}$
wherein $C_K=C_B+a_{KB}*D_{KB}$, with $|D_{KB}|=1$,
wherein $a_{eB}$ and $a_{KB}$ are positive scalars,
wherein for the scalar product $s_{eK}:=D_{eB}\cdot D_{KB}$:
$s_{eK}<0$, especially $s_{eK}<-0.5$, preferably $s_{eK}<-0.8$.

In a further development of the invention, the first ceramic body (1) and/or the second ceramic body (2) comprise/comprises $Al_2O_3$.

In a further development of the invention, the active hard solder, or braze, comprises Zr, Ni and Ti.

In a further development of the invention, the composition $C_K$, contains essentially zirconium and titanium, with $(50+x)$ atom-% titanium and $(50-x)$ atom-% zirconium, wherein $x<10$ especially $x<5$, wherein the composition $C_K$ is present especially in the $\alpha$-(Zr, Ti) phase.

In a further development of the invention, the composition $C_K$ has a coefficient of thermal expansion $\alpha(C_K)$, wherein $\alpha(C_K)\leq 10\cdot 10^{-6}/K$, especially $\alpha(C_K)\leq 9.5\cdot 10^{-6}/K$, preferably $\alpha(C_K)\leq 9.2\cdot 10^{-6}/K$.

In a further development of the invention, the boundary layer has a composition $C_B$, which comprises, for instance, 42 to 52 atom-% Zr, 23 to 28 atom-% Ni and 24 to 30 atom-% Ti, wherein, in given cases, Al diffuses in, wherein, in cases where Al is present, especially the titanium fraction is reduced.

The pressure measuring cell of the invention includes an assembly of the invention, wherein the first ceramic body is a membrane body of a measuring membrane of the pressure measuring cell, wherein the second ceramic body is a platform of the pressure measuring cell, and wherein the platform and the membrane body are joined pressure-tightly with one another by means of the joint, which is ring-shaped.

The method of the invention for manufacturing a special assembly of the invention, which assembly comprises a first ceramic body and a second ceramic body, wherein the first ceramic body and the second ceramic body are joined by the method by means of an active hard solder, or braze, includes steps as follows: providing the active hard solder, or braze, between the ceramic bodies, wherein the active hard solder, or braze, has, averaged over a continuous core volume, an average composition $C_{K0}$ having a liquidus temperature $T_l(C_{K0})$, wherein the composition $C_K$ has a coefficient of thermal expansion $\alpha(C_K)$, wherein $\alpha(C_K)=m\cdot\alpha(K)$, wherein $m\leq 1.5$, especially $m\leq 1.3$ and preferably $m\leq 1.2$, wherein $\alpha(K)$ is the average coefficient of thermal expansion of the ceramic material, respectively the ceramic materials of the first and second ceramic bodies, wherein the active hard solder, or braze, has, on at least one of its surfaces facing the ceramic bodies, a boundary layer having an average composition $C_{B0}$, wherein the composition $C_{B0}$ has a liquidus temperature $T_l(C_{B0})$, which lies not less than 50 K, preferably not less than 100 K, and especially preferably not less than 200 K, under the liquidus temperature $T_l(C_{K0})$ of the average composition $C_{K0}$ of the core volume, and heating the ceramic bodies and the active hard solder, or braze, in a vacuum soldering, brazing process, up to melting of the composition $C_{B0}$, wherein the melt of the boundary layer mixes in the transition to the core volume with the material of the core volume, whereby the liquidus temperature of the boundary layer is increased, so that the boundary layer at least partially isothermally solidifies or becomes more viscous.

The compositions of the core volume $C_{K0}$ and the boundary layer $C_{B0}$ are advantageously describable by vectors, wherein $C_{K0}:=(c_{K01}, \ldots, c_{K0N})$, wherein $|C_{K0}|=1$, and wherein the $c_{Ki}$ are the stoichiometric fractions of the components $K_i$ $i=1, \ldots, N$ of the average composition of the active hard solder, or braze, in the core volume, wherein $C_{B0}:=(c_{B01}, \ldots, c_{B0N})$, wherein $|C_{B0}|=1$, and wherein the $c_{B0i}$ are the stoichiometric fractions of the components $K_i$ $i=1, N$ of the average composition of the active hard solder, or braze, in the boundary layer.

In a further development of the method, the providing of the active hard solder, or braze, includes that a solder preform, which has the composition $C_{K0}$, is coated by means of gas phase deposition, for example, by sputtering, on at least one surface, preferably on two oppositely lying surfaces, with a boundary layer, which has the composition $C_{B0}$.

In a further development of the method, the providing of the active hard solder, or braze, includes that at least one surface section of a ceramic body, especially two oppositely lying surface sections of the two ceramic bodies, is, respectively are, coated with a boundary layer, which has the composition $C_{B0}$, wherein the coating occurs, for example, by gas phase deposition, especially sputtering. In an embodiment of this further development of the method, there is arranged between the ceramic bodies provided with the boundary layer a solder preform, which has a core volume with the composition $C_{K0}$, and which, in given cases, is coated with a boundary layer of composition $C_{B0}$.

In a further development of the invention, the composition $C_K$ contains essentially zirconium and titanium, with $(50+x)$ atom-% titanium and $(50-x)$ atom-% zirconium, wherein $x<10$ especially $x<5$, wherein the composition $C_{K0}$ is present especially in the $\alpha$-(Zr, Ti) phase.

In a further development of the method, the composition $C_{B0}$ comprises, for instance, 42 to 52 atom-% Zr, 23 to 28 atom-% Ni and 24 to 30 atom-% Ti, for example, 45 to 49 atom-% Zr, 24.5 to 27 atom-% Ni and 26 to 29.5 atom-% Ti, and preferably 47 atom-% Zr, 26 atom-% Ni and 27 atom-% Ti.

BRIEF DESCRIPTION OF THE DRAWINGS

The invention will now be explained based on the example of an embodiment illustrated in the drawing, the figures of which show as follows.

DETAILED DISCUSSION IN CONJUNCTION WITH THE DRAWINGS

Figure 1:
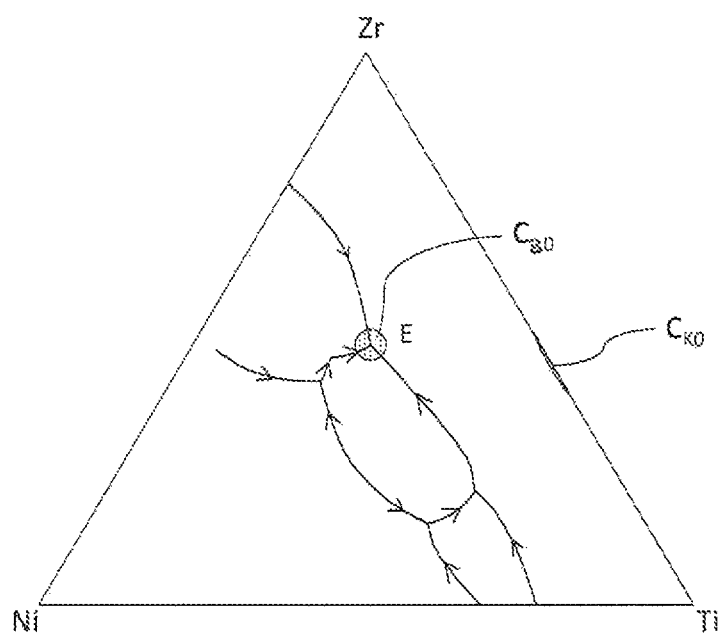
FIG. 1 is a simplified diagram for the ternary system Ni—Ti—Zr.

The diagram shown in FIG. 1 for a ternary metal system, namely the Ni—Ti—Zr system is based on data of Gupta (Journal of Phase Equilibria, 20(4), pages 441-448, August 1999). It shows the position of the eutectic point E and various eutectic valleys. The arrows in the eutectic valleys point toward lower liquidus temperature.

According to the invention, a core volume of an active hard solder, or braze, is provided, which determines the mechanical properties of a joint formed therewith, having a composition $C_{K0}$, for example, as a solder preform, wherein the surfaces of the core volume are coated with a boundary layer of a composition $C_{B0}$, wherein the last named composition has a significantly lower melting point than the composition of the core volume.

The composition $C_{K0}$ of the core volume is preferably so selected that the coefficient of thermal expansion of the composition deviates as little as possible from the coefficient of thermal expansion of the ceramic material of the ceramic bodies to be joined. The coefficient of thermal expansion was ascertained for different compositions. In such case, compositions of zirconium and titanium with (50+x) atom-% titanium and (50−x) atom-% zirconium, wherein x<10, especially x<5, especially in the α-(Zr, Ti) phase proved especially suitable as composition of the core volume $C_{K0}$ for joining of corundum. For the coefficient of thermal expansion $\alpha(C_K)$, $\alpha(C_K) \leq 9.5 \cdot 10^{-6}$/K, especially $\alpha(C_K) \leq 9.2 \cdot 10^{-6}$/K.

As shown in FIG. 1, the composition $C_{B0}$ of the boundary layer can be selected to be at or near the eutectic point, such as indicated in FIG. 1. A suitable composition $C_{B0}$ comprises, for example, 47 atom-% Zr, 26 atom-% Ni and 27 atom-% Ti. The associated liquidus temperature amounts, for instance, to 770° C.

The liquidus temperature of a composition of the core volume $C_{K0}$ with 55 atom-% Zr and 45 atom-% Ni amounts, in contrast, to more than, for instance, 1200° C.

Correspondingly, the boundary layer can be reliably melted at a soldering temperature of 800° C. to 850° C., for example, without melting the core volume of the active hard solder, or braze.

As a result, the fine crystalline, respectively amorphous, structure of the core volume can be retained in the soldering. Solely at the interface between the boundary layer and the core volume is there, in given cases, an exchange of materials between the core volume and the boundary layer, such that the boundary layer experiences, sectionally, an increase of the liquidus temperature, which, depending on the selected soldering temperature, effects that regions of the boundary layer become isothermally viscous or solidify. In any case, however, the structure of the core volume scarcely changes.

Figure 2:
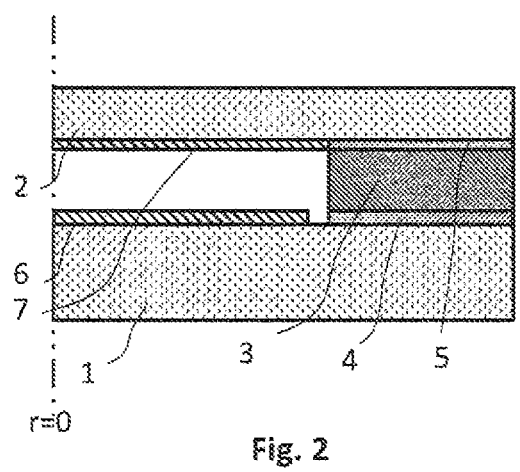
FIG. 2 is a partial longitudinal section through a pressure measuring cell of the invention.

As an example of application of this procedure, the components of a pressure measuring cell are joined. FIG. 2 shows the arrangement before the joining. The pressure measuring cell includes a ceramic platform 1 and a measuring membrane 2. Each of these is composed of aluminum oxide. The measuring membrane 2 and the platform are to be joined by means of an active hard solder, or braze, wherein the active hard solder, or braze, is provided as a annular solder preform 3 with a thickness of, for example, 20 μm, wherein on both end faces of the solder ring a boundary layer 4, 5 is deposited by sputtering-on a thickness of 1 μm to 2 μm.

The solder preform has the above described composition $C_{K0}$ of the core volume, thus Zr and Ti in the stoichiometric ratio of, for instance, 3 to 1. The boundary layer has, in contrast, a composition $C_{B0}$, which lies near or at the eutectic point E.

By soldering in high vacuum at, for example, 850° C., the boundary layers 4, 5 react with the platform and with the measuring membrane 1, 2, so that a joint is formed, wherein the core volume of the active hard solder, or braze, does not melt and essentially retains its amorphous structure. The measuring membrane and the platform each bear an electrode 7, 6 of a capacitive transducer, wherein the electrodes can be prepared, for example, by depositing Ni.

The invention claimed is:

1. An assembly, comprising:
a first ceramic body:
a second ceramic body; and
a joint for connecting said first ceramic body to said second ceramic body, wherein:
said joint contains an active hard solder, or braze;
said active hard solder, or braze, averaged over a continuous core volume, which is spaced from said first ceramic body and from said second ceramic body, in each case, by at least 1 μm, has an average composition $C_K$ having a liquidus temperature $T_l(C_K)$;
the composition $C_K$ has a coefficient of thermal expansion $\alpha(C_K)$, wherein $\alpha(C_K) = m \cdot \alpha(K)$, wherein $m \leq 1.5$, wherein $\alpha(K)$ is the average coefficient of thermal expansion of the ceramic material of said first and said second ceramic bodies;
said joint has a first boundary layer and a second boundary layer of said active hard solder, or braze, which border on said first ceramic body and said second ceramic body, respectively;
wherein at least one of said boundary layers, which lies outside of the core volume, has an average composition $C_B$ having a liquidus temperature $T_l(C_B)$, which lies not less than 50 K, under the liquidus temperature $T_l(C_K)$ of the average composition $C_K$ of the core volume.

2. The assembly as claimed in claim 1, wherein:
said at least one boundary layer has a thickness of no more than 3 μm.

3. The assembly as claimed in claim 1, wherein:
the composition $C_B$ has a liquidus temperature $T_l(C_B)$, which lies no more than 300 K above the liquidus temperature $T_l(C_e)$ of the eutectic point, respectively of the nearest intersection with a eutectic valley having a composition $C_e$ in the composition space.

4. The assembly as claimed in claim 1, wherein:
the alloy of the joint at the eutectic point, respectively at the nearest intersection with a eutectic valley, has a composition $C_e$ in the composition space, wherein $C_e := (c_{e1}, \ldots, c_{eN})$, wherein $|C_e| = 1$, wherein the $c_{ei}$ are the stoichiometric fractions of the components $K_i$ with $i = 1, \ldots, N$ at the eutectic point, respectively at the nearest intersection with a eutectic valley, wherein the difference between the composition $C_e$ and the composition $C_B$ is describable with a normalized vector difference $D_{eB}$, wherein: $C_e = C_B + a_{eB} * D_{eB}$, with $|D_{eB}| = 1$, wherein the difference between the composition $C_K$ and the composition $C_B$ is describable with a normalized vector difference $D_{KB}$, wherein: $C_K = C_B + a_{KB} * D_{KB}$, with $|D_{KB}|=1$, wherein $a_{eB}$ and $a_{KB}$ are positive scalars, and wherein for the scalar product $s_{eK}:=D_{eB}\cdot D_{KB}$: $s_{eK}<0$.

5. The assembly as claimed in claim 1, wherein:
said first ceramic body and/or said second ceramic body comprise $Al_2O_3$.

6. The assembly as claimed in claim 1, wherein:
said active hard solder, or braze, comprises Zr, Ni and Ti.

7. The assembly as claimed in claim 6, wherein:
the composition $C_K$ contains essentially zirconium and titanium, with (50+x) atom-% titanium and (50−x) atom-% zirconium, wherein x<10, and wherein the composition $C_K$ is present in the α-(Zr, Ti) phase.

8. The assembly as claimed in claim 1, wherein:
the composition $C_K$ has a coefficient of thermal expansion $\alpha(C_K)$, wherein $\alpha(C_K) \leq 10\cdot 10^{-6}/K$.

9. The assembly as claimed in claim 1, wherein:
said at least one boundary layer has a thickness of no more than 1 μm.

10. The assembly as claimed in claim 1, wherein:
the composition $C_B$ has a liquidus temperature $T_l(C_B)$, which lies no more than 150 K above the liquidus temperature $T_l(C_e)$ of the eutectic point, respectively of the nearest intersection with a eutectic valley having a composition $C_e$ in the composition space.

11. The assembly as claimed in claim 1, wherein:
the composition $C_B$ has a liquidus temperature $T_l(C_B)$, which lies no more than 50 K above the liquidus temperature $T_l(C_e)$ of the eutectic point, respectively of the nearest intersection with a eutectic valley having a composition $C_e$ in the composition space.

12. A pressure measuring cell, comprising:
a first ceramic body, said first ceramic body is a membrane body of a measuring membrane of the pressure measuring cell;
a second ceramic body, said second ceramic body being a platform of the pressure measuring cell; and
a ring-shaped joint for connecting said first ceramic body to said second ceramic body, wherein:
said joint contains an active hard solder, or braze,
said active hard solder, or braze, averaged over a continuous core volume, which is spaced from said first ceramic body and from said second ceramic body, in each case, by at least 1 um has an average composition $C_k$ having a liquidus temperature $T_l(C_k)$,
the composition CK has a coefficient of thermal expansion *(CK), wherein *(CK)=m**(K), wherein m*1.5, wherein *(K) is the average coefficient of thermal expansion of the ceramic material of said first and said second ceramic bodies;
said joint has a first boundary layer and a second boundary layer, which border on said first ceramic body and said second ceramic body, respectively; and
at least one of said boundary layers, which lies outside of the core volume, has an average composition CB having a liquidus temperature Tl(CB), which lies not less than 50 K under the liquidus temperature Tl(CK) of the average composition CK of the core volume.

13. A method for manufacturing an assembly comprising a first ceramic body and a second ceramic body joined by means of an active hard solder, or braze, comprising the steps of: providing the active hard solder, or braze, between the ceramic bodies, wherein the active hard solder, or braze, has, averaged over a continuous core volume, an average composition $C_{Ko}$ having a liquidus temperature $T_l(C_{Ko})$, wherein the composition has a coefficient of thermal expansion $\alpha(C_K)$, wherein $\alpha(C_K)=m\cdot\alpha(K)$, wherein m<1.5, wherein α(K) is the average coefficient of thermal expansion of the ceramic material of said first and second ceramic bodies, wherein the active hard solder, or braze, has, on at least one of its surfaces facing said ceramic bodies, a boundary layer having an average composition $C_{BO}$, wherein the composition $C_{BO}$ has a liquidus temperature $T_l(C_{BO})$, which lies not less than 50 K, under the liquidus temperature $T_l(C_{KO})$ of the average composition $C_{KO}$ of the core volume, wherein $C_{BO}:=(c_{BO1}, \ldots, c_{BON})$, wherein $|C_{BO}|=1$, and wherein the $c_{BOi}$ are the stoichiometric fractions of the components $K_i$ i=1, ..., N of the average composition of the active hard solder, or braze, in said boundary layer; and
heating the ceramic body and the active hard solder, or braze, in a vacuum soldering, brazing process, up to a melting of the composition $C_{BO}$, wherein:
the boundary layer develops a melt and said melt mixes in the transition to the core region with the material of the core volume, whereby the liquidus temperature of the boundary layer is increased, so that the boundary layer at least partially isothermally solidifies or becomes more viscous.

14. A method as claimed in claim 13, wherein:
the providing of the active hard solder, or braze, includes that a solder preform, which has the composition $C_{K0}$, is coated by means of gas phase deposition, by sputtering, on at least one surface with a boundary layer, which has the composition $C_{B0}$.

15. A method as claimed in claim 13, wherein:
the providing of the active hard solder, or braze, includes that at least one surface section of a ceramic body is coated with a boundary layer, which has the composition $C_{B0}$, wherein the coating occurs by sputtering.

16. The method as claimed in claim 15, wherein:
there is arranged between the ceramic bodies provided with the boundary layer a solder preform, which has a core volume with the composition $C_{K0}$, and which is coated with a boundary layer of composition $C_{B0}$.

17. The method as claimed in claim 13, wherein:
the composition $C_K$ contains essentially zirconium and titanium with (50+x) atom-% titanium and (50−x) atom-% zirconium, wherein x<10 wherein the composition $C_K$ is present in the α-(Zr, Ti) phase.

18. The method as claimed in claim 13, wherein:
the composition $C_{B0}$ comprises 42 to 52 atom-% Zr, 23 to 28 atom-% Ni and 24 to 30 atom-% Ti.

19. The assembly as claimed in claim 1, wherein:
said at least one boundary layer has a thickness of no more than 2 μm.

* * * * *